US012564224B2

(12) United States Patent
Wang

(10) Patent No.: US 12,564,224 B2
(45) Date of Patent: Mar. 3, 2026

(54) ELECTRONIC CIGARETTE ATOMIZATION CORE

(71) Applicant: Aspire North America LLC, Venice, CA (US)

(72) Inventor: Michael Wang, Redondo Beach, CA (US)

(73) Assignee: Aspire North America LLC, Venice, CA (US)

( * ) Notice: Subject to any disclaimer, the term of this patent is extended or adjusted under 35 U.S.C. 154(b) by 360 days.

(21) Appl. No.: 18/136,197

(22) Filed: Apr. 18, 2023

(65) Prior Publication Data

US 2024/0349799 A1 Oct. 24, 2024

(51) Int. Cl.

| | |
|---|---|
| ***A24F 47/00*** | (2020.01) |
| ***A24F 40/46*** | (2020.01) |
| ***A24F 40/48*** | (2020.01) |
| ***H05B 3/48*** | (2006.01) |
| *A24F 40/10* | (2020.01) |

(52) U.S. Cl.

CPC .............. *A24F 40/46* (2020.01); *A24F 40/48* (2020.01); *H05B 3/48* (2013.01); *A24F 40/10* (2020.01); *H05B 2203/021* (2013.01)

(58) Field of Classification Search

CPC .......... A24F 40/10; A24F 40/40; A24F 40/46; A24F 40/48

See application file for complete search history.

(56) References Cited

U.S. PATENT DOCUMENTS

| | | | | |
|---|---|---|---|---|
| 11,439,182 | B1 | 9/2022 | Wang | |
| 2013/0319438 | A1* | 12/2013 | Liu | A24F 40/485 131/329 |
| 2020/0154768 | A1 | 5/2020 | Han et al. | |
| 2020/0170298 | A1 | 6/2020 | Lee et al. | |
| 2022/0338538 | A1 | 10/2022 | Schlaegel | |
| 2023/0218000 | A1* | 7/2023 | Zhang | A24F 40/46 131/329 |

* cited by examiner

*Primary Examiner* — Eric Yaary
(74) *Attorney, Agent, or Firm* — Harter Secrest & Emery LLP

(57) ABSTRACT

An atomization core provides a core body having a central channel, a first cylindrical portion having an outer diameter, and a second cylindrical portion having an outer diameter. The central channel extends through the first and second cylindrical portions, and the first cylindrical portion, the second cylindrical portion, and the central channel are aligned about a central axis. The outer diameter of the second portion is larger than the outer diameter of the first portion.

11 Claims, 9 Drawing Sheets

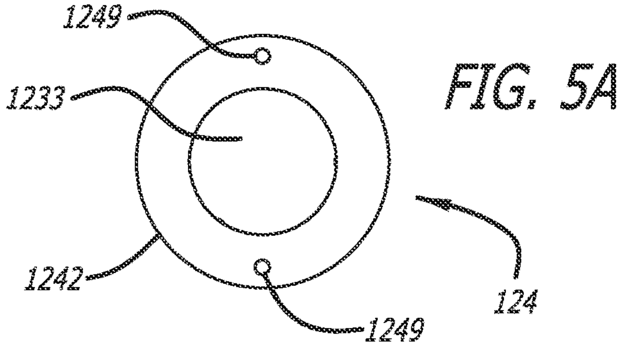
FIG. 5A
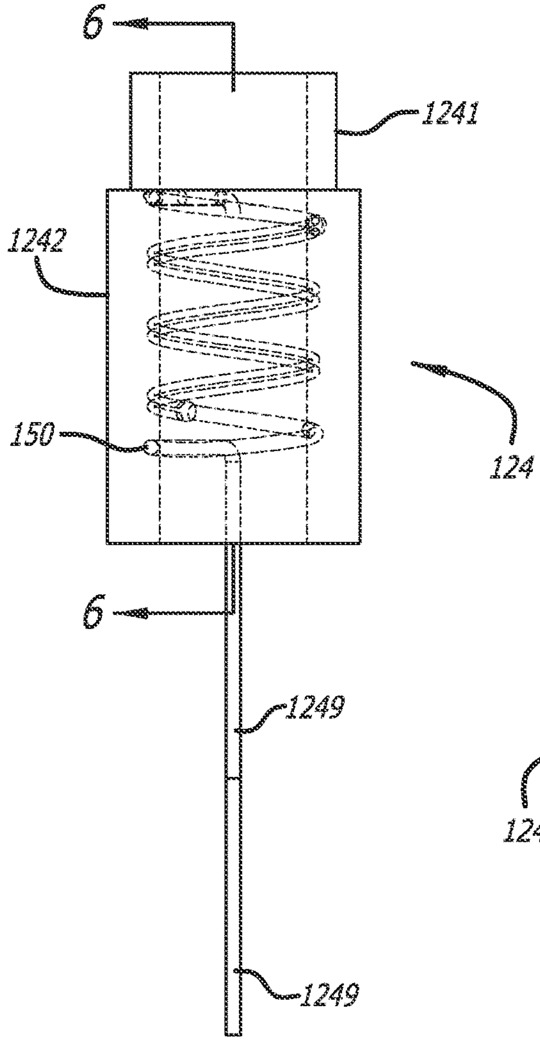
FIG. 5B
FIG. 6
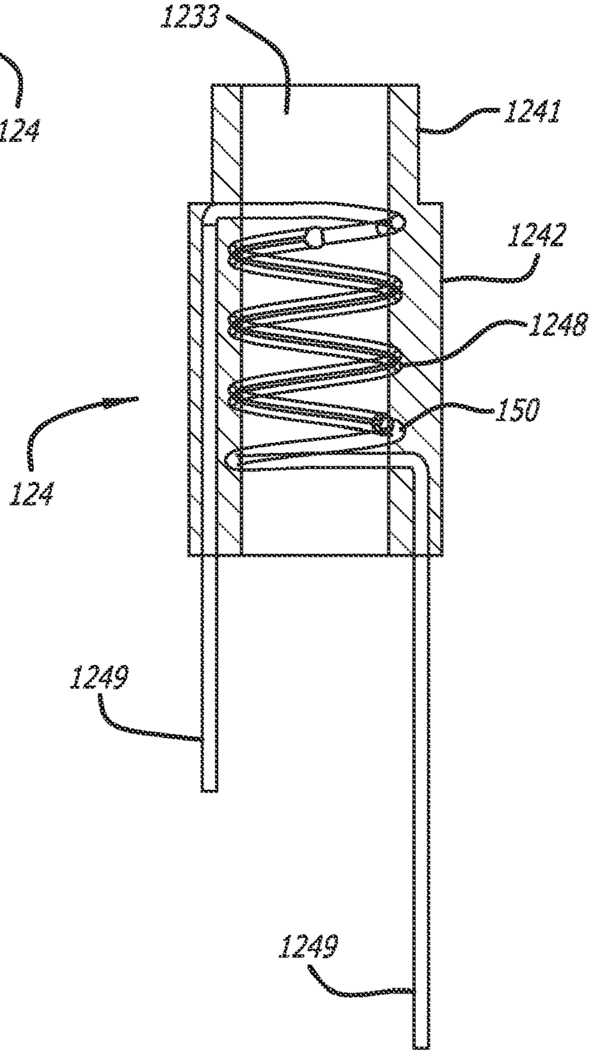

FIG. 9A
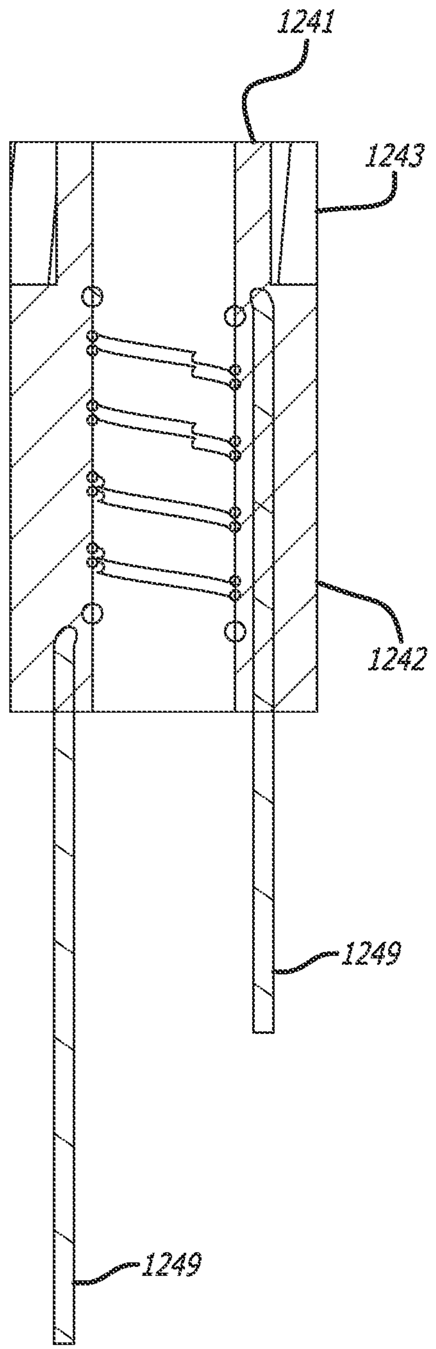
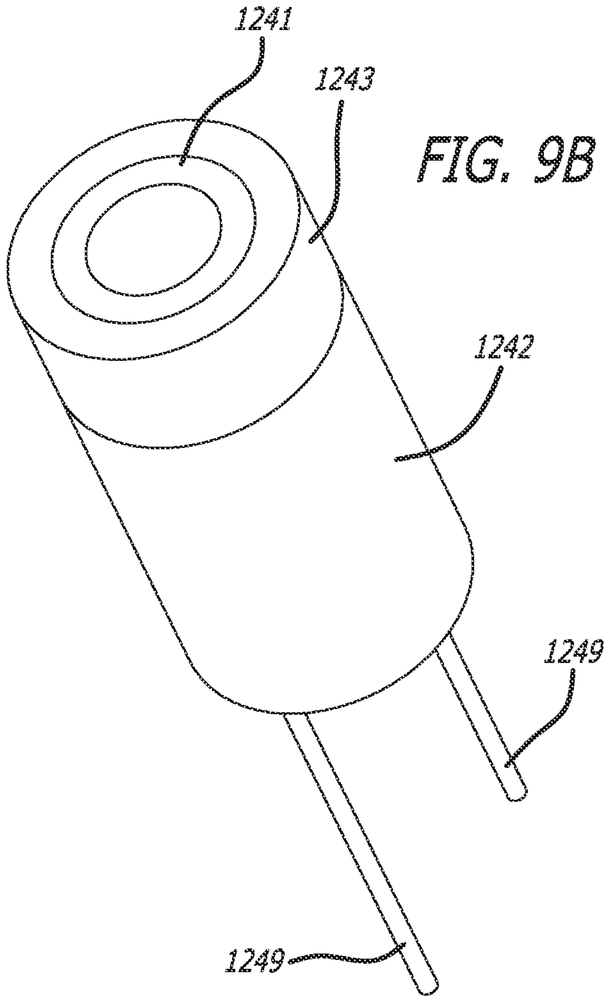
FIG. 9B

ELECTRONIC CIGARETTE ATOMIZATION CORE

TECHNICAL FIELD

The present disclosure generally relates to atomization and vaporizing devices, and more particularly, to an atomization core of an electronic cigarette device.

BACKGROUND

Electronic cigarette (also known as "E-cigarette"), or vaping, devices can be used to deliver nicotine, cannabis (THC, CBD), flavorings, chemicals, and other substances. These devices are known by many different names and come in many shapes, sizes and device types. These devices may also be referred to as "E-cigs", "Vapes", "Vape pens," "dab pens," "dab rigs," "Tanks," "Mods," "Pod-Mods," and the like. Use of e-cigarette, or vaping, products is sometimes referred to as "vaping."

Typically, a conventional e-cigarette device or electronic cigarette device includes several basic components: a cartridge (also referred to as a reservoir or pod), an atomizer (or atomizer core) including a heating element, a power source (e.g., a battery), and a mouthpiece. The cartridge (or reservoir or pod) can hold various substances. The cartridge may be pre-loaded with these substances, and sold with or separate from the rest of the e-cigarette device. One particular substance is a liquid solution (sometimes referred to as "e-liquid" or "e-juice"). In one particular example, the liquid solution may contain varying amounts of nicotine, cannabis (THC, CBD), flavorings, and/or other chemicals. Some conventional e-cigarette devices may not use a cartridge to hold the liquid solution. Instead, these e-cigarette devices include a reservoir built-into the device for containing the liquid solution, and into which the liquid solution can be filled. In many e-cigarette devices, puffing by a user results in an airflow entering the electronic cigarette device. As the air flows into the electronic cigarette device, the generated airflow will trigger an airflow sensor, and thereby activate the heating element of the atomizer. The electric heating element, disposed within an atomization channel of the atomizer core, starts to heat the e-liquid, and generate aerosol or vapor, which then flows out through the atomization channel under the drive of the airflow, and the resulting aerosol or vapor travels to the mouthpiece where the aerosol or vapor is then inhaled by the user.

As seen in FIGS. 1A and 2A, a conventional atomizer core 24 includes a cylindrical, ceramic body 242. In a conventional electronic cigarette device, the conventional cylindrical, ceramic atomizer core 24 is disposed within an atomization tube 22 that is within a housing 10. The housing 10 includes an e-liquid storage cavity 31, an e-liquid inlet hole 221, and an e-liquid guide cotton 23. The e-liquid 400 is transferred from the e-liquid storage cavity 31 to the e-liquid guide cotton 23 through the e-liquid inlet hole 221 and finally into the ceramic core 24. The ceramic body 242 includes a region 37 with a high density of e-liquid vapor. The e-liquid vapor at an upper end of the conventional atomization core 24 is adjacent a region 37 having a high density of e-liquid vapor because the e-liquid entering through the e-liquid inlet hole 221 permeates the e-liquid guide cotton 23 and enters into the atomization core 24 along the entire outer side of the atomization body 242 (resulting in a high density of e-liquid vapor), and because the e-liquid 400 at the bottom diffuses from bottom to top due to a diffusion effect. There is no place for the e-liquid to move, and the e-liquid can only return to the middle of the ceramic core 24 to drip down into the atomization channel 33.

As seen in FIGS. 1A and 2A, in a conventional atomization core 24, the concentration of e-liquid vapor at one side of the ceramic core 24 is relatively high, and the e-liquid 400 can only be precipitated and accumulated from the atomization channel 33, resulting in formation of a viscous e-liquid film that can create a blockage 35. In a conventional electronic cigarette device, the conventional cylindrical, ceramic atomizer core 24 absorbs e-liquid 400 from the e-liquid storage cavity 31. As a heating element heats up, the e-liquid 400 absorbed by the cylindrical, ceramic atomizer core 24 is heated by the heating element to generate aerosol or vapor, and the aerosol or vapor flows out upward through an atomization channel 33 under the drive of airflow (flowing from bottom to top, as indicated a large arrow in FIG. 1A). Meanwhile, some e-liquid 400 absorbed in the ceramic atomizer core 24 will also move upward with the airflow under the drive of the airflow, and flow out of a top end of the cylindrical, ceramic atomizer core 24. After enough e-liquid 400 accumulates at the top end of the cylindrical, ceramic atomizer core 24, the accumulated e-liquid 400 can flow inward in a radial direction of the cylindrical, ceramic atomizer core 24 towards the atomization channel 33, and then start flowing downward from the top end of the atomization channel 33 (e.g., due to gravity) into the atomization channel 33 (as indicated by small arrows in FIG. 1A) towards a bottom of the atomization channel 33. This e-liquid 400 will start to condense on the wall of the atomization channel 33 and become more and more viscous over time. Repeated use of the electronic cigarette device results in further accumulation of this e-liquid on the wall of the atomization channel and can eventually create a blockage 35 in the atomization channel 33 that will prevent proper function of the cylindrical, ceramic atomizer core 24. During vaping by the user, when airflow passes through an airflow sensor, the airflow sensor operates and a circuit of a heating element is activated, automatically enabling an atomization function. When e-liquid 400 is accumulated at one end of the conventional ceramic core 24 and forms the e-liquid film which blocks the atomization channel 33, the airflow cannot pass through the e-liquid film when the user inhales again, resulting in that the airflow sensor cannot sense a vaping action (that is, the circuit of the heating core cannot be triggered). When that occurs, the ceramic core 24 cannot perform a heating operation, and thus the whole electronic cigarette device becomes unusable. A blockage 35 anywhere in the atomization channel 33 prevents smooth air flow in the electronic cigarette device which, in turn, prevents the airflow sensor from sensing the airflow which, in turn, prevents activation of the heating element and operation of the electronic cigarette device. The result can be an electronic cigarette device having various problems, including a shortened service life due to the electronic cigarette device becoming inoperable.

Accordingly, there is a need for an improved atomizer core of an electronic cigarette device. There is a further need for an improved atomizer core of an electronic cigarette that reduces blockage capable of impeding operation of the electronic cigarette device. There is an additional need for an improved atomizer core of an electronic cigarette device that reduces build-up of e-liquid in an atomization core of an electronic cigarette device. There is a further need for an improved atomizer core of an electronic cigarette device that is easier to manufacture, assemble, disassemble, adjust, and maintain. The present invention satisfies these needs and provides other related advantages.

SUMMARY OF THE INVENTION

The present invention provides an improved atomizer core of an electronic cigarette device. The present invention provides an improved atomizer core of an electronic cigarette that reduces blockage capable of impeding operation of the electronic cigarette device. The present invention provides an improved atomizer core of an electronic cigarette device that reduces build-up of e-liquid in an atomization core of an electronic cigarette device. The present invention provides an improved atomizer core of an electronic cigarette device that is easier to manufacture, assemble, adjust, and maintain. The present invention satisfies these needs and provides other related advantages.

In accordance with an embodiment of the present invention, an atomization core includes a core body having a central channel, a first cylindrical portion having an outer diameter, and a second cylindrical portion having an outer diameter. The central channel extends through the first and second cylindrical portions. The first cylindrical portion, the second cylindrical portion, and the central channel are aligned about a central axis. The outer diameter of the second portion is larger than the outer diameter of the first portion.

In accordance with a further embodiment of the present invention, the atomization core further includes a heating element embedded in the core body and spirally arranged about the central channel.

In accordance with another embodiment of the present invention, the core body includes a microporous ceramic.

In accordance with an additional embodiment of the present invention, the core body includes a generally cylindrical core body.

In accordance with still another embodiment of the present invention, the central channel includes two separate channels.

In accordance with a still further embodiment of the present invention, the atomization core further includes a generally cylindrical ring disposed about the protrusion, where the ring includes an outer diameter equal to the outer diameter of the second cylindrical portion and an inner diameter configured to fit about the outer diameter of the first cylindrical portion.

This brief summary has been provided so that the nature of the invention may be understood quickly. Additional aspects and advantages of the present invention will be given in part in the following more detailed description, taken in conjunction with the accompanying drawings, which can become apparent from the following description, which illustrate, by way of example, the principles of the invention or be understood through practice of the present invention. Any drawings contained herein constitute a part of this specification and include exemplary embodiments of the present invention and illustrate various objects and features thereof.

DESCRIPTION OF THE FIGURES

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts: The above and/or additional aspects and advantages of the present invention will be apparent and easily understood from the descriptions of the embodiments with reference to the following drawings, wherein:

FIG. 5A illustrates a bottom view of the atomizer core of FIG. 4

FIG. 5B illustrates a side elevation view of the atomizer core of FIG. 4;

FIG. 6 illustrates a cross-sectional view of the atomizer core of FIG. 4, taken along line 6-6 of FIG. 5B;

FIG. 9A illustrates a cross-sectional view of an atomizer core of an electronic cigarette assembly according to an additional embodiment of the present invention;

FIG. 9B illustrates a perspective view of the atomizer core of FIG. 9A;

DETAILED DESCRIPTION

Figure 1A:
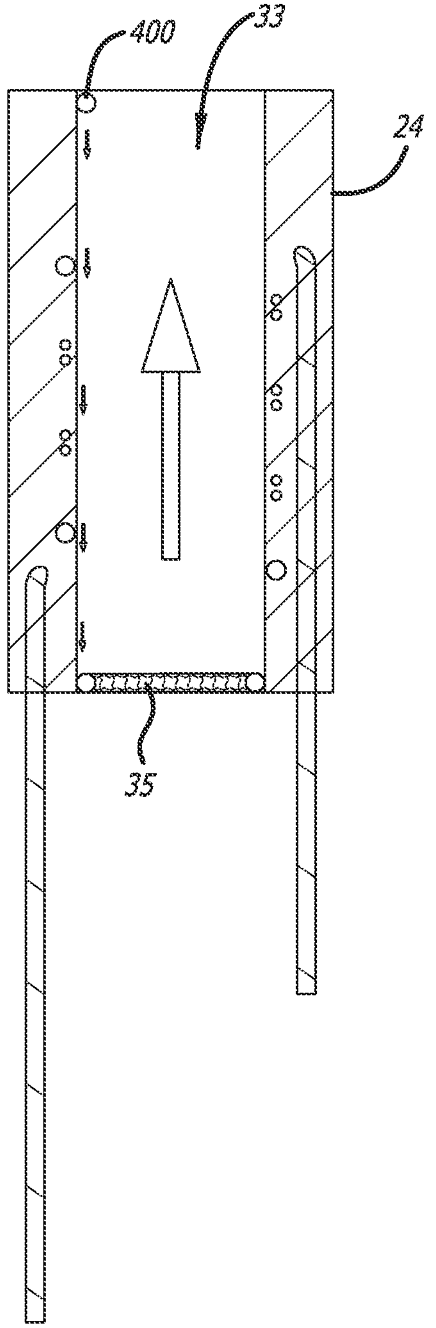
FIG. 1A (Prior Art)
FIG. 1A illustrates a cross-sectional view of a conventional atomizer core of an electronic cigarette assembly, with a large arrow indicating a direction of airflow, and small arrows indicating flow of non-vaporized e-liquid.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an electronic cigarette assembly. The following detailed description describes the present embodiments, with reference to the accompanying drawings. In the drawings, reference numbers label elements of the present embodiments. These reference numbers are reproduced below in connection with the discussion of the corresponding drawing features. It is to be understood that the figures and descriptions of the present invention have been simplified to illustrate elements that are relevant for a clear understanding of the present invention, while eliminating, for the purpose of clarity, many other elements found in electronic cigarette assemblies. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

Embodiments of the present invention are described in detail hereinafter, and illustrations of the embodiments are shown in the drawings, wherein identical or similar reference numerals denote identical or similar elements or elements having the same or similar functions. The embodiments described hereinafter with reference to the drawings are exemplary and only intended to explain the present invention, and cannot be understood as limiting the present invention.

Figure 10:
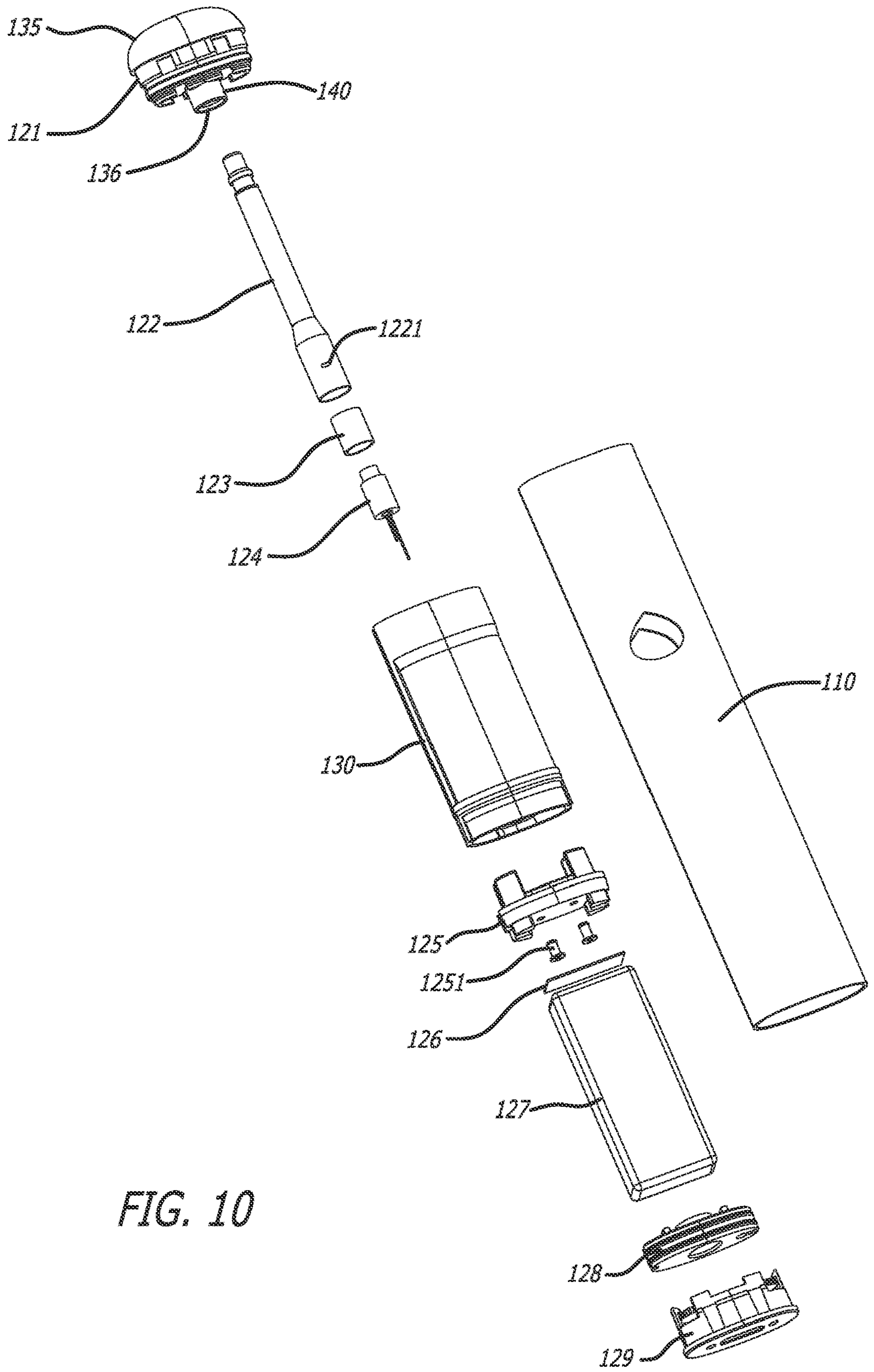
FIG. 10 illustrates an exploded view of an electronic cigarette assembly.
Figure 11:
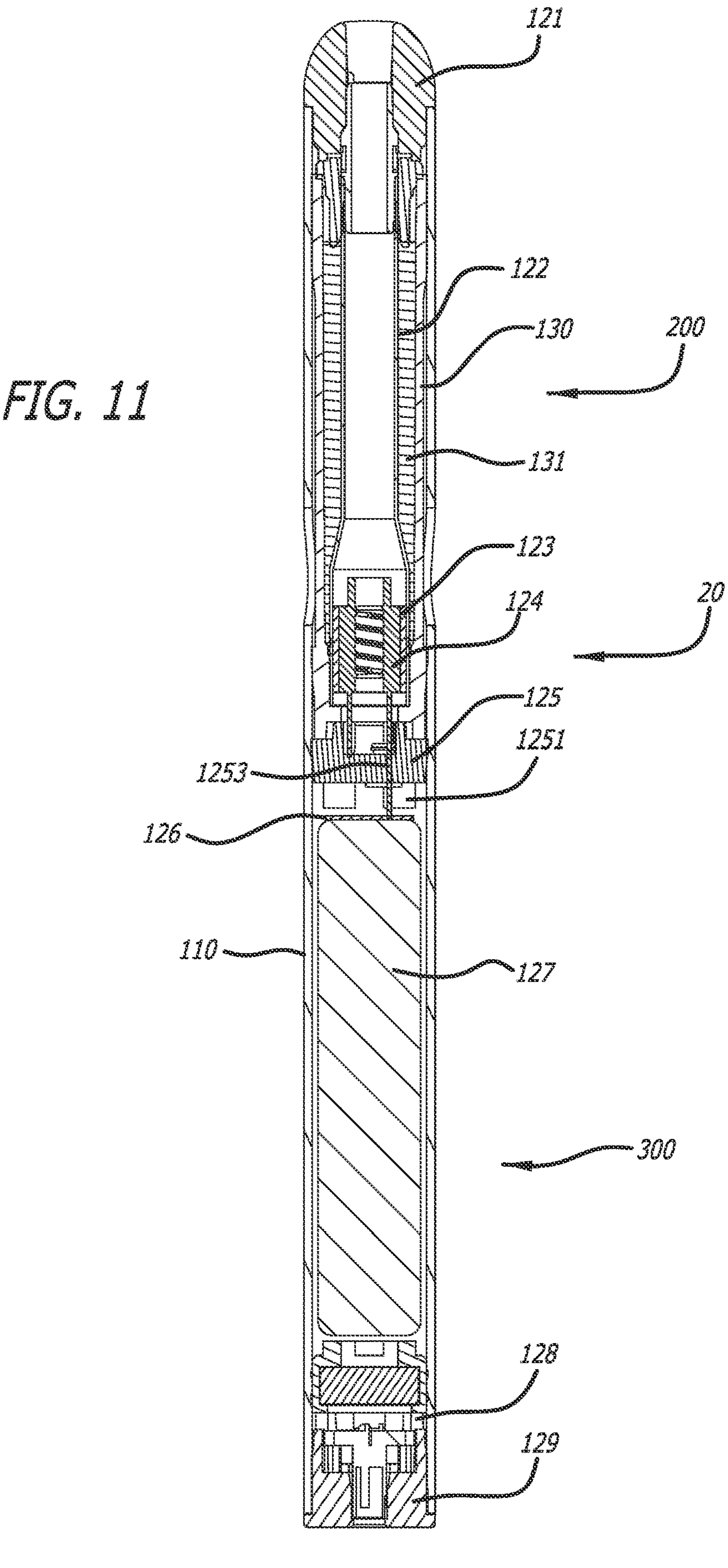
FIG. 11 illustrates a cross-sectional side elevation view of the assembled electronic cigarette assembly of FIG. 10.
Figure 12:
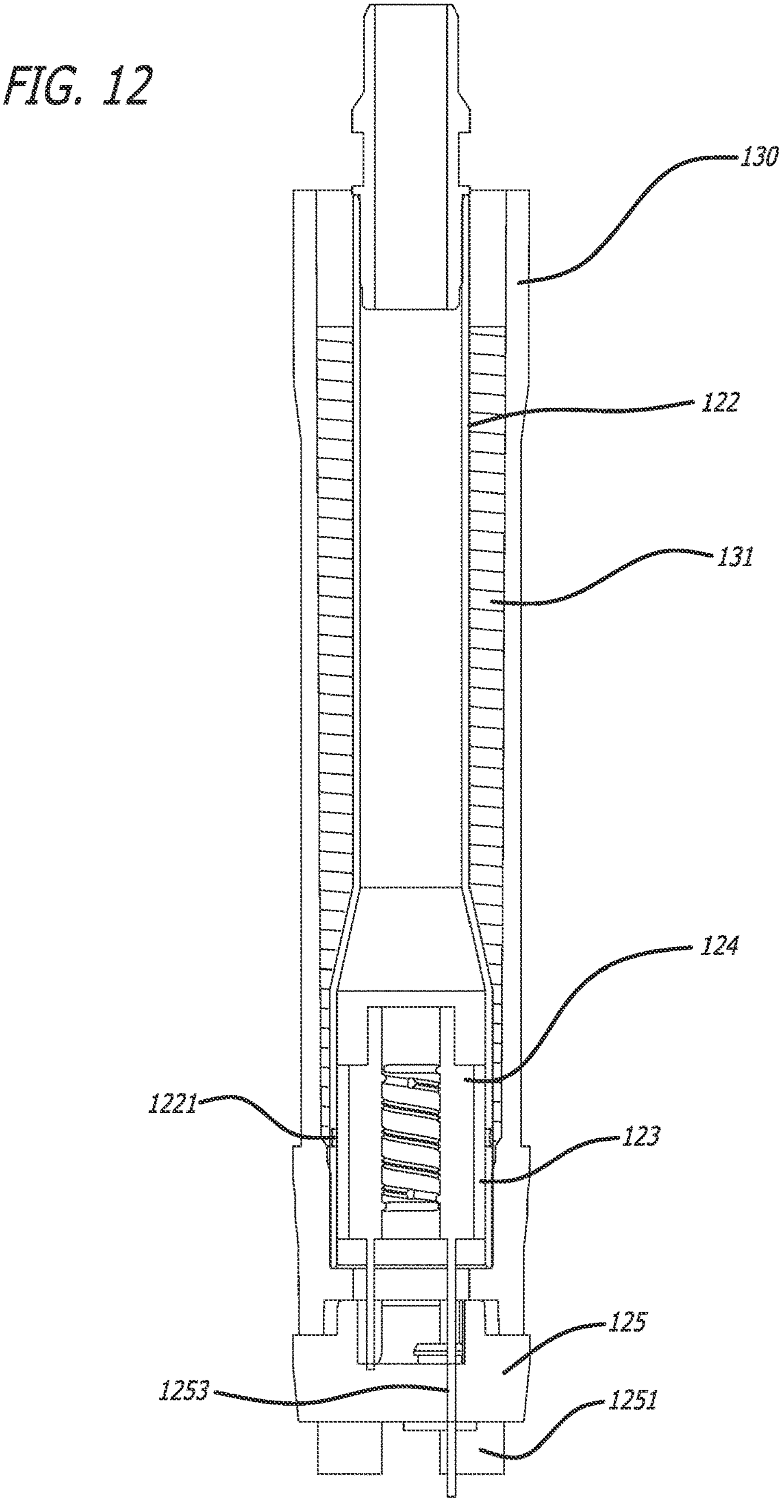
FIG. 12 illustrates a cross-sectional front elevation view of the atomizer assembly (without the upper cap) of the electronic cigarette assembly of FIG. 10.

With reference to FIGS. 1-12, embodiments of the present invention provide for an improved electronic cigarette device. As shown in FIGS. 10-12, an electronic cigarette assembly 20 includes an atomizer assembly 200 and a battery assembly 300. The atomizer assembly 200 includes a housing 130, an upper cap 121, a smoke guide tube or atomization tube 122, an e-liquid guide cotton 123, a ceramic atomizer core 124, an e-liquid storage chamber or cavity 131, an upper sealing seat 125, and a magnet 126. The magnet 126 is configured to engage the atomizer assembly 200 with the battery assembly 300. The battery assembly 300 includes a battery assembly body 127, a lower sealing seat 128, and a lower cap 129. The upper sealing seat 125 and the lower sealing seat 128 may be made from various materials including, but not limited to, silicone, plastic (e.g., thermoplastic, thermoelastic, thermosetting, etc.), and the like. The upper cap 121 and the lower cap 129 may be made from various materials including, but not limited to, plastic (e.g., thermoplastic (e.g., Poly Cyclohexylenedimethylene Terephthalate glycol-modified (PCTG), Polycarbonates (PC), and the like), thermoelastic, thermosetting, etc.), silicone, and the like. The atomizer assembly 200 and the battery assembly 300 are generally disposed within a housing sleeve 110. A portion of the upper cap 121 is received within the housing sleeve 110 at a top end of the housing sleeve 110, and a portion of the lower cap 129 is received within the housing sleeve 110 at a bottom end of the housing sleeve 110. A portion of the upper cap 121 is received within the housing 130 at a top end of the housing 130, and a portion of the upper sealing seat 125 is received within the housing 130 at a bottom end of the housing 130.

The ceramic atomization core 124 is disposed within a lower end of the atomization tube 122. The atomization tube 122 includes an inner, generally cylindrical atomization channel 133. While the atomization channel 133 is illustrated as being generally cylindrical, the atomization channel 133 can have other shapes including polygonal shapes where the atomization channel could have three (3) or more sides. The inner atomization channel 133 is configured to provide a path for discharge of aerosol or vapor to the upper cap 121. The aerosol or vapor is generated by heating and atomization of e-liquid 400 by the ceramic atomization core 124. The upper cap 121 includes a mouthpiece portion 135 for engagement with a user's mouth during use of the electronic cigarette assembly 20. The upper cap 121 also includes a channel or passage 136 defining a path to the atomization tube 122 through which the aerosol or vapor passes through the upper cap 121 to a user's mouth for subsequent inhalation. One end of the channel or passage 136 is open at the mouthpiece portion 135 and one end of the channel or passage 136 is open to the atomization tube 122 through a guide portion 140 of the upper cap 121. The open upper end of the atomization tube 122 extends into the guide portion 140 of the upper cap 121 in communication with the channel or passage 136 such that vaporized liquid or smoke passes from the atomization tube 122 into the channel or passage 136 for subsequent inhalation by the user as the mouthpiece portion 135 is in communication with the atomization channel 133.

The atomization tube 122 includes at least one e-liquid inlet hole 1221 corresponding to the ceramic atomization core 124. The e-liquid inlet hole 1221 allows e-liquid 400 in the e-liquid storage chamber or cavity 131 to enter the ceramic atomization core 124 and move towards an electric heating element 150 for atomization into aerosol or vapor. As mentioned above, the "e-liquid" or "e-juice" 400 is a liquid solution that may contain varying amounts of various substances (alone or in combination) that can include, without limitation, nicotine, cannabis (e.g., THC, CBD), flavorings, and/or other chemicals.

As shown in FIGS. 1B, 2B, and 3-7, a first embodiment of an atomization core 124 is illustrated. The ceramic atomization core 124 is generally cylindrical, and includes a generally cylindrical protrusion or generally cylindrical first portion 1241, a generally cylindrical main body or generally cylindrical second portion 1242, and an electric heating element 150 inlaid in the atomization core 124. The generally cylindrical first and second portions 1241, 1242 are adjacent, and aligned about a central axis (not shown). The atomization core 124 may be made of various ceramic materials including, but not limited to, a microporous ceramic having micropores. The micropores can be in the general range of about 8 um to about 18 um, preferably about 13 um. The electric heating element 150 is spirally arranged. The electric heating element 150 includes an electric heating element body 1248, and pins 1249 led out from two ends of the electric heating element body 1248. A bottom portion of the ceramic atomization core 124 is disposed on the sealing seat 125. The sealing seat 125 includes holes 1253 through which the pins 1249 of the ceramic core 124 extend into a channel of the battery assembly 300, with the pins 1249 riveted with two poles of the battery assembly 300. A pair of electrodes 1251 are made of various materials including, without limitation, conductive metal. The electrodes 1251 are separate electrically connected to the pins 1249.

The electric heating element 150 may come in various forms including, but not limited to two (2) identical electric heating element bodies connected in parallel together and soldered at two ends. In one illustrative embodiment, the size of a soldered dot left after soldering cannot be more than 0.35 mm (as the larger the soldered dot, the easier it becomes for a portion of the soldered dot to contact an adjacent heating coil of the electric heating element 150, and cause a short circuit).

Figure 2A:
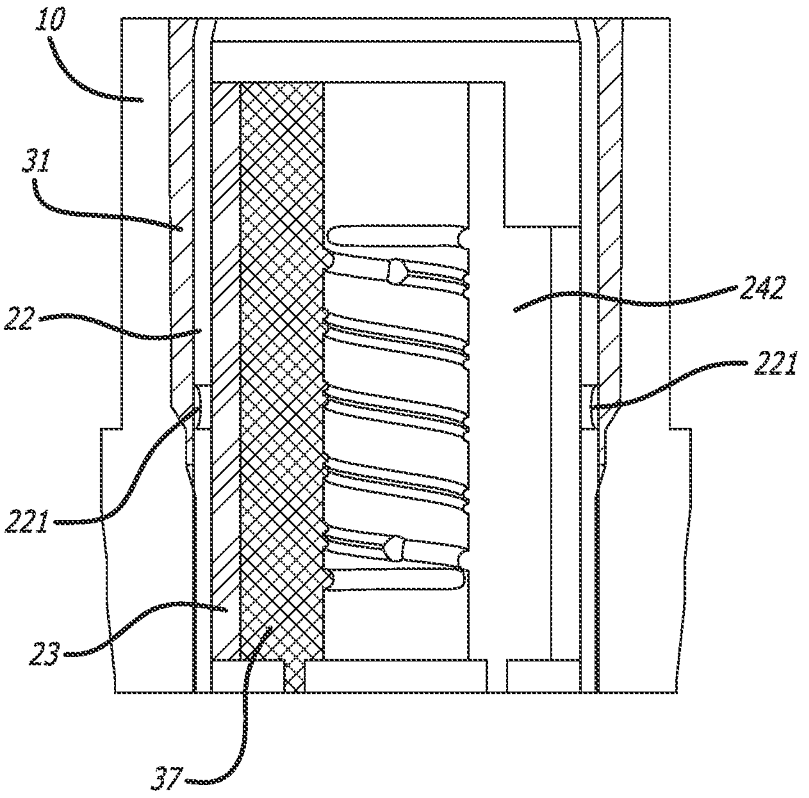
FIG. 2A (Prior Art)
FIG. 2A illustrates a partial cross-sectional view of the conventional atomizer core of FIG. 1A.
Figure 2B:
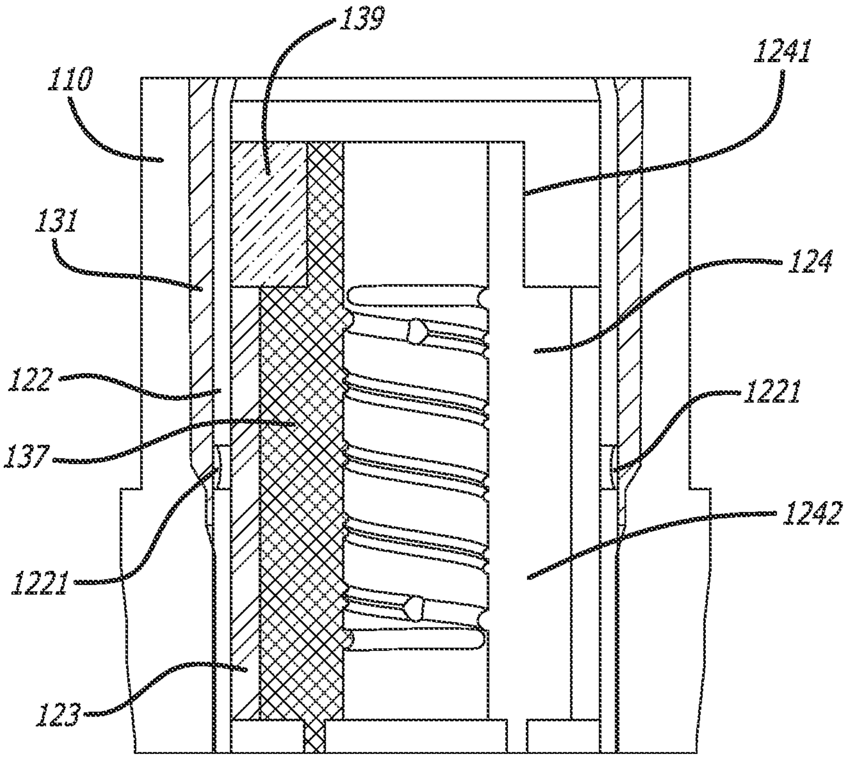
FIG. 2B illustrates a partial cross-sectional view of the atomizer core of FIG. 1B.
Figure 3:
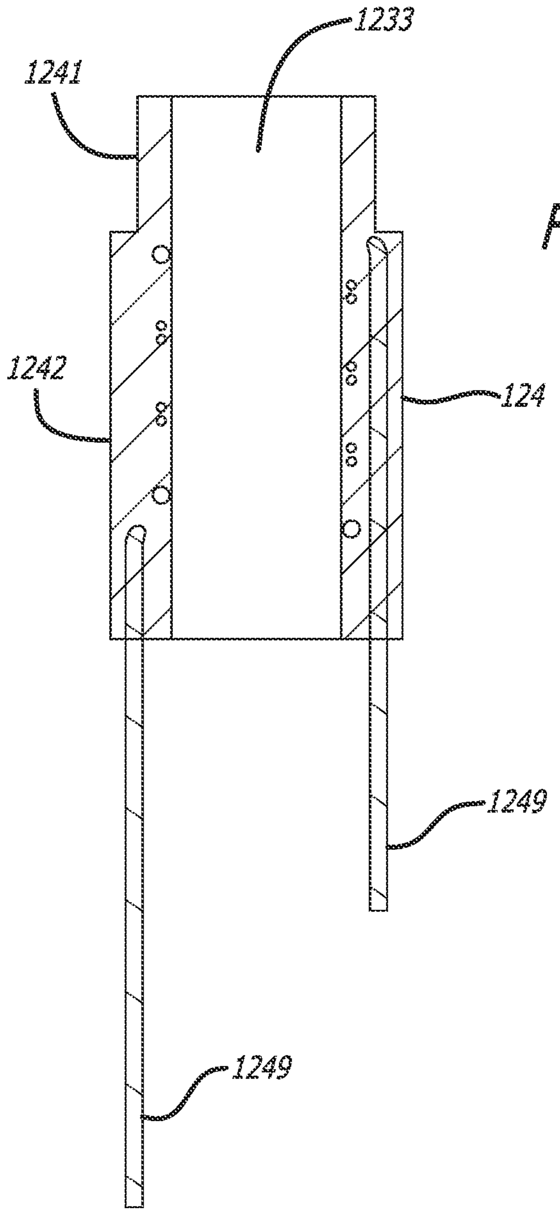
FIG. 3 illustrates the atomizer core of FIG. 1B, without the arrows.
Figure 4:
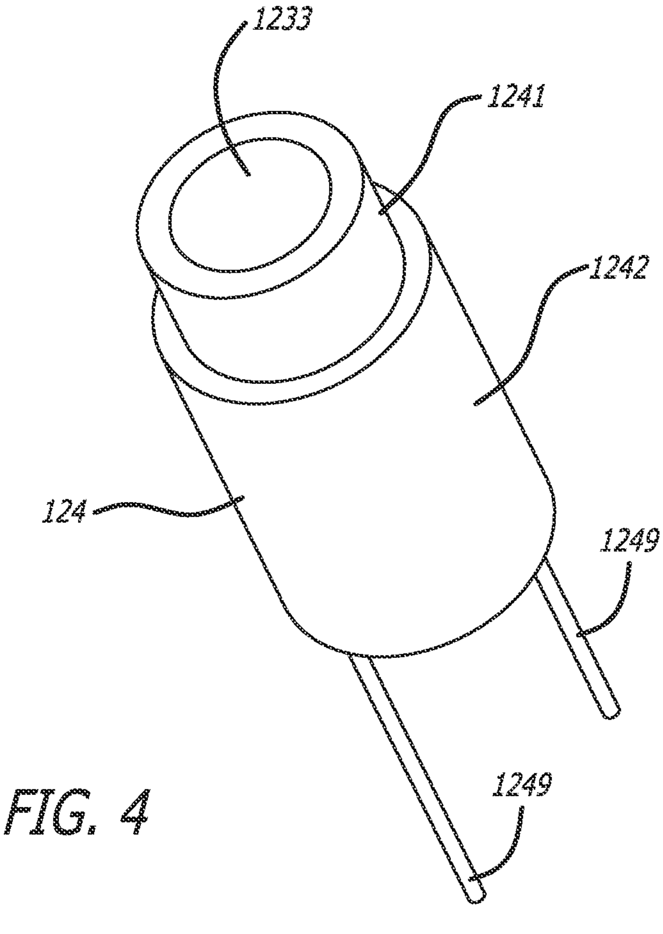
FIG. 4 illustrates a perspective view of the atomizer core of FIG. 3.
Figure 7:
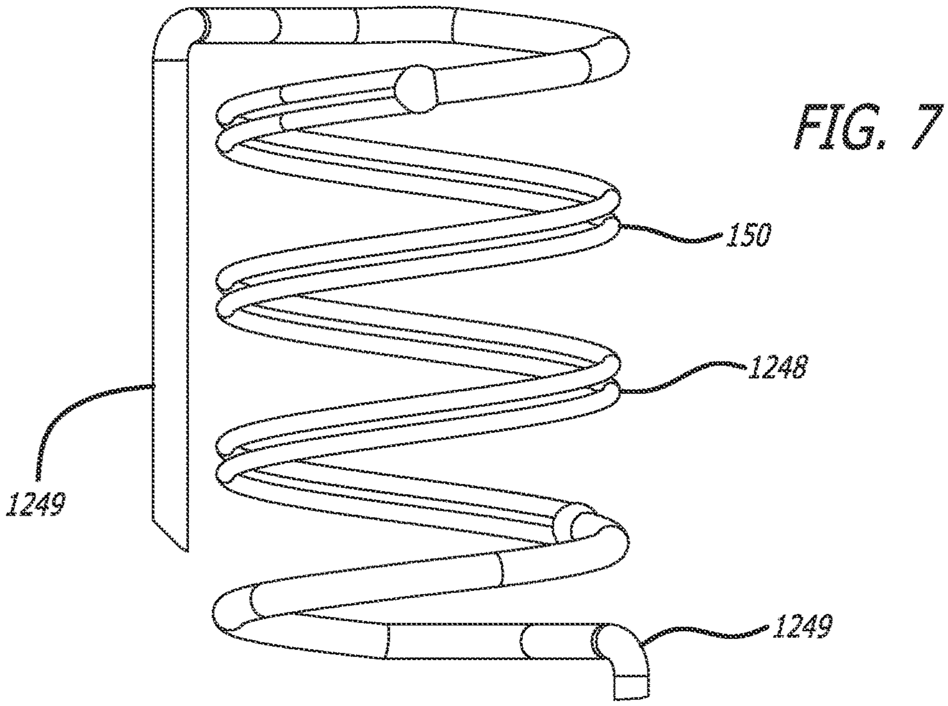
FIG. 7 illustrates a side elevation view of a heating element of the atomizer core of FIG. 4.

As shown in FIG. 2B, a partial cross-sectional view of a cigarette assembly 20 includes a ceramic core 124, a housing 110, an e-liquid storage chamber or cavity 131, an atomization tube 122, an e-liquid inlet hole 1221 and an e-liquid guide cotton 123. The ceramic atomization core 124 includes an upper, generally cylindrical protrusion portion or first portion 1241 and a lower, generally cylindrical main body portion or second portion 1242. The upper, generally cylindrical protrusion portion or first portion 1241 has a smaller outer diameter than an outer diameter of the lower, generally cylindrical main body portion or second portion 1242. The shape of the ceramic atomization core 124 may be made by various methods including, without limitation, being integrally formed by injection molding. In essence, the ceramic atomization core 124 has the appearance that a recess or notch has been formed around the circumference of the upper portion of the atomization core 124. The ceramic core 124 has an inner, generally cylindrical atomization channel (or central channel) 1233 configured to provide a path for discharge of aerosol or vapor to the atomization channel 133. The diameter of the atomization channel 1233 in the protrusion or first portion 1241 is the same diameter as the diameter of the atomization channel 1233 in the main body or second portion 1242. The ceramic atomization core 124 is of one-piece construction with the protrusion or first portion 1241 and the main body or second portion 1242 made from the same ceramic material. In the alternative, the ceramic atomization core 124 may be made from separate first and second portions 1241, 1242 joined together, where the first and second portions 1241, 1242 may be made from the same or different microporous materials (e.g., ceramic). The exterior surfaces of the first and second portions 1241, 1242 may be viewed as surfaces through which e-liquid or e-liquid vapor is absorbed, while e-liquid or vaporized e-liquid is emitted from the interior surfaces of the first and second portions 1241, 1242 forming the atomization channel 133.

Figure 1B:
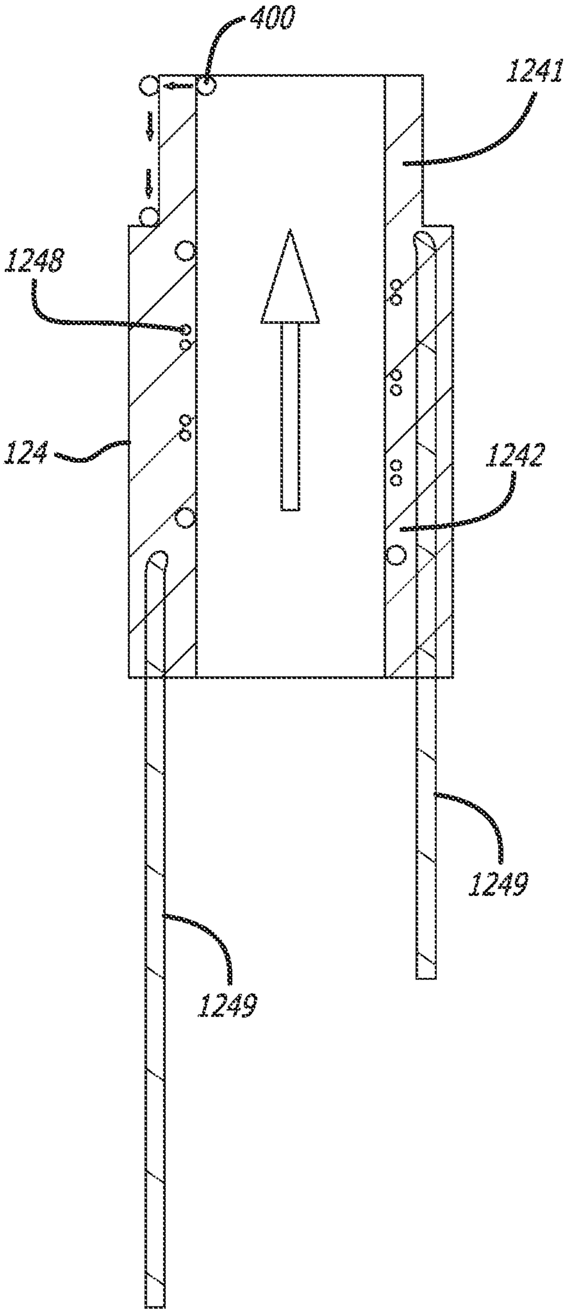
FIG. 1B illustrates a cross-sectional view of an atomizer core of an electronic cigarette assembly according to an embodiment of the present invention, with a large arrow indicating a direction of airflow, and small arrows indicating flow of non-vaporized e-liquid.

The e-liquid 400 is transferred from the e-liquid storage chamber or cavity 131 to the e-liquid guide cotton 123 through the e-liquid inlet hole 1221 and finally into the ceramic core 124. As seen in FIGS. 1B and 2B, an effect of the smaller outer diameter of the protrusion or first portion 1241 is to allow e-liquid 400 at the upper end portion of the atomization core 124 to be able to flow from an outer side to and down into a recess 139 defined by body of the atomization tube 122, the outer body of the ceramic core 124, and the e-liquid guide cotton 123. When in the recess 139, the e-liquid 400 can be absorbed into the ceramic atomization core 124 so that the e-liquid 400 can be recycled and used again by the ceramic atomization core 124.

As seen in FIG. 2B, the e-liquid 400 in the e-liquid storage chamber is not in direct contact with a first end of the atomization core 124. The recess 139 is a lean or low density region for e-liquid vapor as compared to a high density region 137 of e-liquid vapor within the ceramic body 1242. Due to the relatively low density of the e-liquid vapor in the recess 139, part of the e-liquid vapor directly passes into the ceramic core 124 under a diffusion effect. In the atomization core 124, the e-liquid guide cotton 123 is in direct contact with the outer diameter of the main body portion or second portion 1242, but not in direct contact with the outer diameter of the protrusion or first portion 1241. Also, the e-liquid 400 at the bottom diffuses from bottom to top due to the diffusion effect; and after narrowing, the e-liquid cannot be in contact with the e-liquid inlet hole 221, and the e-liquid is less likely to be in contact with a lower portion and then diffuses slowly, thus the e-liquid vapor hardly re-enters the ceramic core 124. Furthermore, part of the e-liquid moves to the recess 139 along an edge of the ceramic core 124, returns to the ceramic core 124 from the recess 139, and accordingly, is fully used by the electric heating element 150.

The respective outer diameters of the protrusion or first portion 1241 and the main body or second portion 1242 can be adjusted as needed as long as the outer dimension of the protrusion or first portion 1241 is smaller than the outer diameter of the main body or second portion 1242.

Figure 8A:
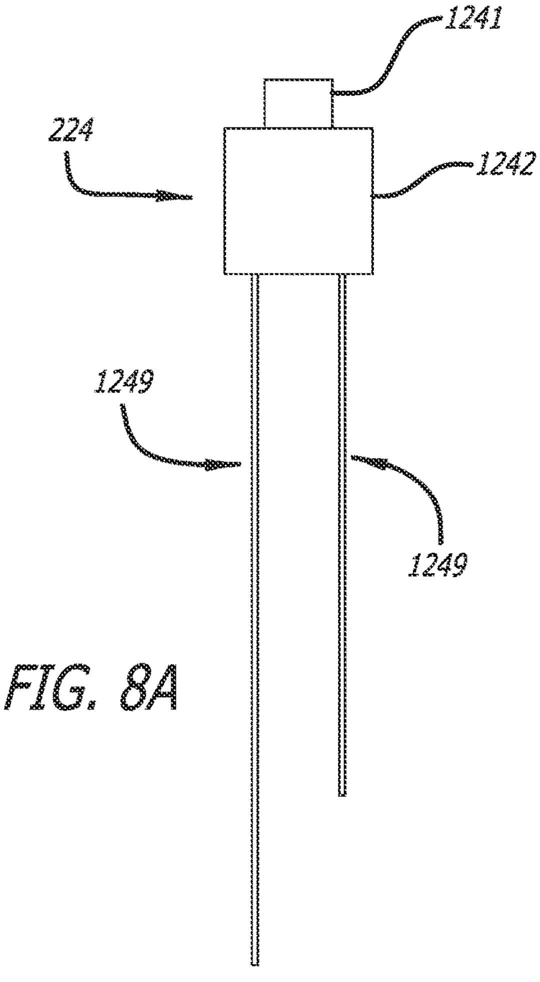
FIG. 8A illustrates a side elevation view of the atomizer core of an electronic cigarette assembly according to another embodiment of the present invention.
Figure 8B:
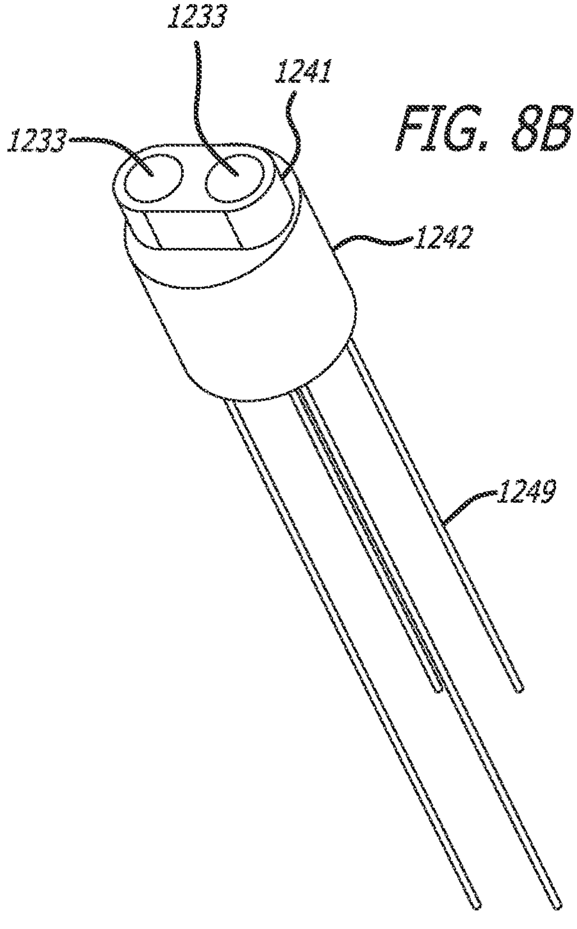
FIG. 8B illustrates a perspective view of the atomizer core of FIG. 8A.

As seen in FIGS. 8A-8B, another embodiment of a ceramic atomization core 224 is the same/similar to the ceramic atomization core 124, with the main exception that the atomization core 224 includes two (2) atomization channels 1233, and other parts being arranged in the same manner. There are two (2) separate electric heating elements 150, and they are parallel circuits. Each atomization channel 1233 has its own heating element 150. Each heating element 150 has a pair of leads 1249. In the alternative, a single heating element 150 can be arranged around the two atomization channels 1233.

As seen in FIGS. 9A-9B, a ring-shaped e-liquid absorbing cotton or a high-porosity ceramic 1243 (e.g., a porosity higher than that of the ceramic material the atomization core 124 is made from) may be disposed about the protrusion or first portion 1241 so that the e-liquid can be quickly guided from the recess 139 back into the ceramic core 124.

The atomizer core 124 provides various advantages, such as prolonged service life as compared with the conventional cylindrical atomizer 24, in which the e-liquid vapor forms the e-liquid film to block the atomization channel 33, resulting in problems such as short service life of the atomizer. Furthermore, e-liquid usage efficiency is improved by the atomizer core 124 since unused e-liquid can be re-used by the ceramic core 124.

In addition, the claimed invention is not limited in size and may be constructed in various sizes in which the same or similar principles of operation as described above would apply. Furthermore, the figures (and various components shown therein) of the specification are not to be construed as drawn to scale.

The terminology used herein is for the purpose of describing particular example embodiments only and is not intended to be limiting. Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps. In other words, unless explicitly stated to the contrary, embodiments “comprising” or “having” an element or a plurality of elements having a particular property can include additional elements not having that property. In other words, the terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. In other words, the use of “including,” “comprising,” “having,” “containing,” “involving,” and variations thereof, is meant to encompass the items listed thereafter and additional items. Further, references to “one embodiment” or “one implementation” are not intended to be interpreted as excluding the existence of additional embodiments or implementations that also incorporate the recited features. The term “exemplary” is intended to mean “an example of”.

As used herein, the singular forms “a”, “an” and “the” may be intended to include the plural forms as well, unless the context clearly indicates otherwise. In other words, an element or step recited in the singular and preceded by the word “a” or “an” should be understood as not necessarily excluding the plural of the elements or steps. Further, references to “one embodiment” or “one implementation” are not intended to be interpreted as excluding the existence of additional embodiments or implementations that also incorporate the recited features. Thus, when introducing elements of aspects of the disclosure or the examples thereof, the articles “a,” “an,” “the,” and “said” are intended to mean that there are one or more of the elements. In other words, the indefinite articles “a”, “an”, “the”, and “said” as used in the specification and in the claims, unless clearly indicated to the contrary, should be understood to mean “at least one.” The use of the expression “at least” or “at least one” suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. Any range or value given herein can be extended or altered without losing the effect sought, as will be apparent to the skilled person.

When an element or layer is referred to as being “on”, “engaged to”, “connected to” or “coupled to” another element or layer, it may be directly on, engaged, connected or coupled to the other element or layer, or intervening elements or layers may be present. In contrast, when an element is referred to as being “directly on,” “directly engaged to”, “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

In the description of the present invention, several means one or more, a plurality of means more than two, greater than, less than, more than, and the like are understood as not including this number, while above, below, within, and the like are understood as including this number. If there are the descriptions of first and second, it is only for the purpose of distinguishing technical features, and should not be understood as indicating or implying relative importance, implicitly indicating the number of the indicated technical features or implicitly indicating the order of the indicated technical features.

In the description of the present invention, it should be noted that the terms “installation”, “connected” and “connection” if any shall be understood in a broad sense unless otherwise specified and defined. For example, they may be fixed connection, removable connection or integrated connection; may be mechanical connection or electrical connection; and may be direct connection, or indirect connection through an intermediate medium, and connection inside two elements. The specific meanings of the above terms in the present invention can be understood in a specific case by those of ordinary skills in the art.

While various spatial and directional terms, such as “up”, “down”, “front”, “rear”, “left”, “right”, “vertical”, “horizontal”, “top”, “bottom”, “inside”, “outside”, “upper,” “lower,” and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90°, and the like. In other words, spatially relative terms, such as “inner,” “outer,” “beneath”, “below”, “above”, “lateral”, “longitudinal” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

In the description of the present invention, it should be understood that the orientation or position relationship indicated by the terms is based on the orientation or position relationship shown in the accompanying drawings, it is only for the convenience of description of the present invention and simplification of the description, and it is not to indicate or imply that the indicated device or element must have a specific orientation, and be constructed and operated in a specific orientation. Therefore, the terms shall not be understood as limiting the present invention.

As used herein, a structure, limitation, or element that is “configured to” perform a task or operation is particularly structurally formed, constructed, or adapted in a manner corresponding to the task or operation. For purposes of clarity and the avoidance of doubt, an object that is merely capable of being modified to perform the task or operation is not “configured to” perform the task or operation as used herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to ‘an’ item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure. In other words, the method steps, processes, and operations described herein are not to be construed as necessarily requiring their performance in the particular order discussed or illustrated, unless specifically identified as an order of performance. It is also to be understood that additional or alternative steps may be employed.

The phrase “one or more of the following: A, B, and C” means “at least one of A and/or at least one of B and/or at least one of C.” The phrase “and/or”, as used in the specification and in the claims, should be understood to mean “either or both” of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law.

As briefly discussed above, as used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Moreover, features described in connection with one embodiment of the invention may be used in conjunction with other embodiments, even if not explicitly stated above. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

Various technical features of the above embodiments may be combined randomly, and in order to simplify the description, possible combinations of various technical features in the above embodiments are not all described. However, as long as the combinations of these technical features have no contradiction, the combinations of these technical features should be considered as falling into the scope recorded by the specification.

Although the embodiments of the present invention have been shown and described, those of ordinary skills in the art may understand that various changes, modifications, substitutions and variations may be made to these embodiments without departing from the principle and purpose of the present invention, and the scope of the present invention is defined by the claims and their equivalents.

The following claims are thus to be understood to include what is specifically illustrated and described above, what is conceptually equivalent, what can be obviously substituted and also what incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. An atomization core, comprising:
- a core body having a central channel, a first cylindrical portion having an outer diameter, and a second cylindrical portion having an outer diameter;
- e-liquid guide cotton in direct contact with the outer diameter of the second cylindrical portion, but not in direct contact with the outer diameter of the first cylindrical portion;
- a heating element embedded in the core body and spirally arranged around the central channel;
- wherein the central channel extends through the first cylindrical portion and the second cylindrical portion;
- wherein the first cylindrical portion, the second cylindrical portion, and the central channel are aligned about a central axis; and
- wherein the outer diameter of the second portion is larger than the outer diameter of the first portion.

2. The atomization core of claim 1, wherein the core body comprises a microporous ceramic.

3. The atomization core of claim 1, wherein the core body comprises a generally cylindrical core body.

4. The atomization core of claim 1, wherein the central channel comprises two separate channels.

5. The atomization core of claim 1, further comprising a generally cylindrical ring disposed about the first cylindrical portion, wherein the ring includes an outer diameter equal to the outer diameter of the second cylindrical portion and an inner diameter configured to fit about the outer diameter of the first cylindrical portion.

6. An atomization core, comprising:
- a core body having a central channel, a first cylindrical portion having an outer diameter, and a second cylindrical portion having an outer diameter;
- a generally cylindrical ring disposed about the first cylindrical portion;
- wherein the central channel extends through the first cylindrical portion and the second cylindrical portion;
- wherein the first cylindrical portion, the second cylindrical portion, and the central channel are aligned about a central axis;
- wherein the outer diameter of the second portion is larger than the outer diameter of the first portion; and
- wherein the ring includes an outer diameter equal to the outer diameter of the second portion and an inner diameter configured to fit about the outer diameter of the first cylindrical portion.

7. The atomization core of claim 6, further comprising a heating element embedded in the core body and spirally arranged about the central channel.

8. The atomization core of claim 6, wherein the core body comprises a microporous ceramic.

9. The atomization core of claim 6, wherein the core body comprises a generally cylindrical core body.

10. The atomization core of claim 6, wherein the central channel comprises two separate channels.

11. The atomization core of claim 6, further comprising e-liquid guide cotton in direct contact with the outer diameter of the second cylindrical portion, but not in direct contact with the outer diameter of the first cylindrical portion.

* * * * *